Nov. 22, 1938.  E. FISCHEL  2,137,974
AILERON CONTROL FOR AIRPLANES
Filed Sept. 9, 1936  2 Sheets-Sheet 1

Inventor
Eduard Fischel
by Knight Bros
Attorneys

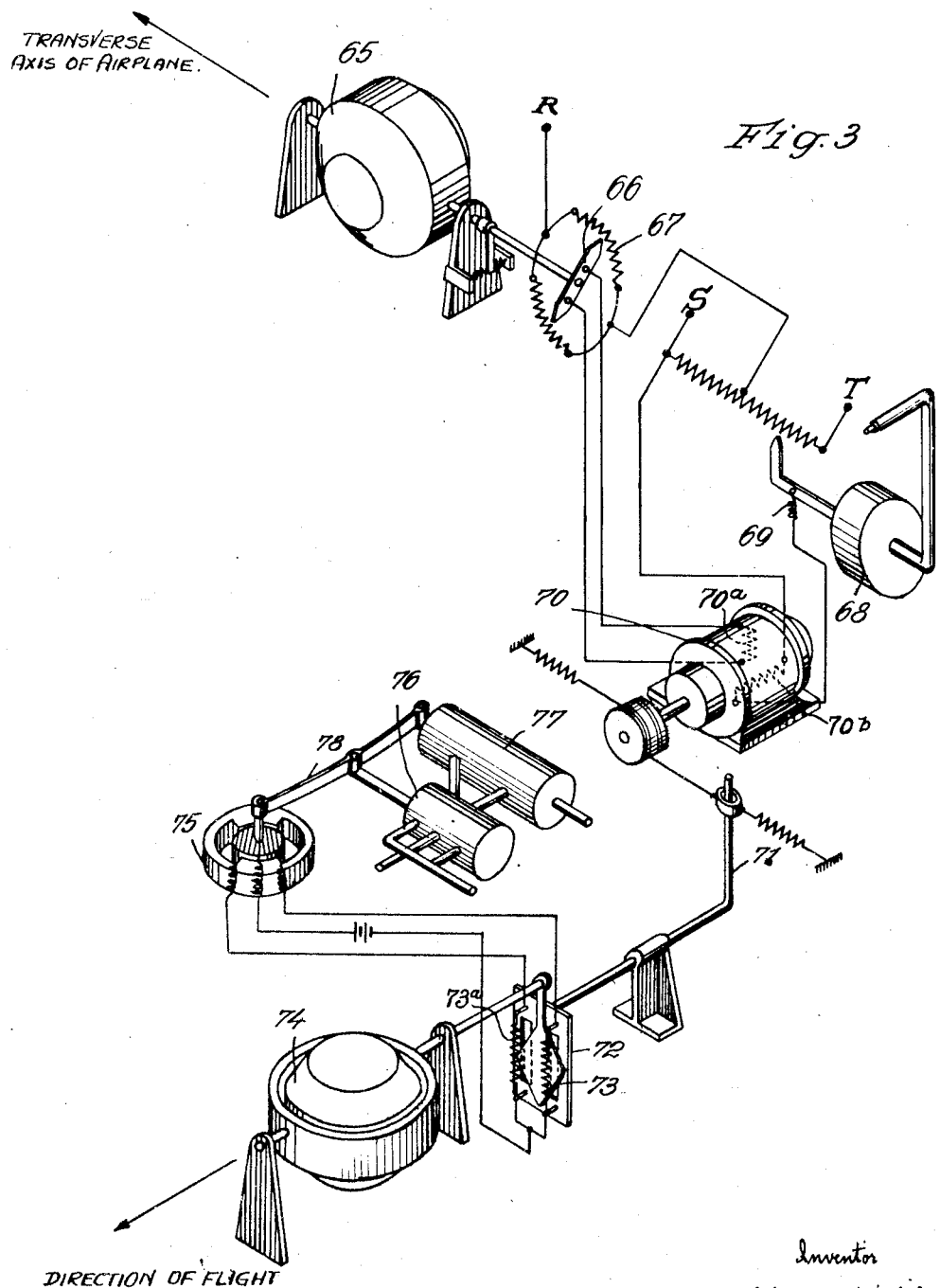

Patented Nov. 22, 1938

2,137,974

UNITED STATES PATENT OFFICE 2,137,974

AILERON CONTROL FOR AIRPLANES

Eduard Fischel, Berlin-Tempelhof, Germany, assignor to Siemens Apparate und Maschinen Gesellschaft mit beschränkter Haftung, Berlin, Germany, a corporation of Germany Application September 9, 1936, Serial No. 99,967
In Germany September 13, 1935

14 Claims. (Cl. 244—79)

My invention relates to improvements in aileron controls for airplanes.

An object of my invention is to provide a hand-operated or automatic aileron control for airplanes, whereby a stable position with respect to the longitudinal axis of the airplane is maintained when flying straight away as well as along a curve at a given speed. Another object of my invention is to maintain a stable position in curves at any speed of the airplane.

It is a well-known fact that an airplane is in a stable position with respect to its longitudinal axis if its transverse axis is at right angles to the apparent vertical existing under the momentarily prevailing operating conditions. Since the apparent vertical and the true vertical coincide when flying straight away the stabilization is attained in this case when the transverse axis is in the horizontal plane. This fact is taken advantage of in airplane stabilizing systems by actuating the aileron control in accordance with the reactions of a gyroscopic horizon.

Such a system fails to function when flying a curve, for the above-mentioned control is not capable of setting the airplane in the curve, as it will always have the tendency to maintain the transverse axis exactly in the horizontal plane.

It has already been proposed to determine the apparent vertical with the aid of a pendulum and to cause the latter to act on the control so as to render possible the use of one and the same device for maintaining a stable position when flying straight away or in curves. The pendulum devices employed for this purpose present, however, the following disadvantages.

An oscillating body suspended in an airplane not only actuates the aileron control in response to the lateral components of motion but also in response to such components occurring for other reasons.

An airplane is, however, very often subjected to such lateral components of motion; for instance, in stormy weather and, particularly, in the case of cross-winds of variable strength. An ordinary pendulum would actuate the aileron control in response to these cross-forces acting on the airplane even in the case of the airplane flying straight away as if the airplane were set in a curve. This must be, as a matter of course, avoided and that is the reason why the previously proposed aileron controls operating with pendulums, gyro pendulums and the like have not given satisfactory results.

The object of my invention is, therefore, to provide an arrangement, whereby the advantages of a gyroscopic horizon and similar devices which are not influenced by the lateral displacement are utilized also for stabilizing the airplane in curves with respect to its longitudinal axis. This may be accomplished according to the invention by additionally influencing the controlling magnitude given by an instrument responsive to inclinations about the longitudinal axis of the airplane but not responsive to the lateral displacements thereof, by a controlling magnitude given by a turn indicator. This may, for instance, be attained by adjusting the intermediate controlling device associated with the artificial horizon in accordance with the turning speed of the airplane about its normal axis in such a manner that the intermediate controlling device of the artificial horizon is in the position corresponding to the above-mentioned stable position of the airplane as soon as the transverse axis is at right angles to the apparent vertical determined by the turning of the airplane about the normal axis and by the speed of the airplane.

That the speed of the airplane is a determining factor for the magnitude of the bank of the airplane which the latter must have in a curve will be apparent from the following consideration:

The bank of an airplane depends chiefly upon the curvature of the curve to be flown. Since the curvature is determined by the radius of curvature it would be possible to set the plane always properly in the curve, if the corresponding radius of curvature were known or could be measured. Now, by the use of a turn indicator in connection with a speedometer it is possible to determine the radius of curvature, for at constant speed, the smaller the radius of curvature the greater the turning speed about the normal axis will be while at constant turning speed the radius of curvature increases with increasing speed of the airplane.

Consequently, by properly combining a turn indicator with a speedometer, a device could be provided which directly indicates the radius of curvature or the curvature of a curve flown by an airplane.

Another object of my invention is to provide an arrangement, whereby the action of the turn responsive device on the banking responsive device is brought into relationship with a speed-responsive device.

In the accompanying drawings are shown some embodiments of my invention in diagrammatic form.

Fig. 3 shows an aileron control with an hydraulic servo-motor, responsive to the combined reactions of the turn, speed and bank responsive devices.

Figure 1:
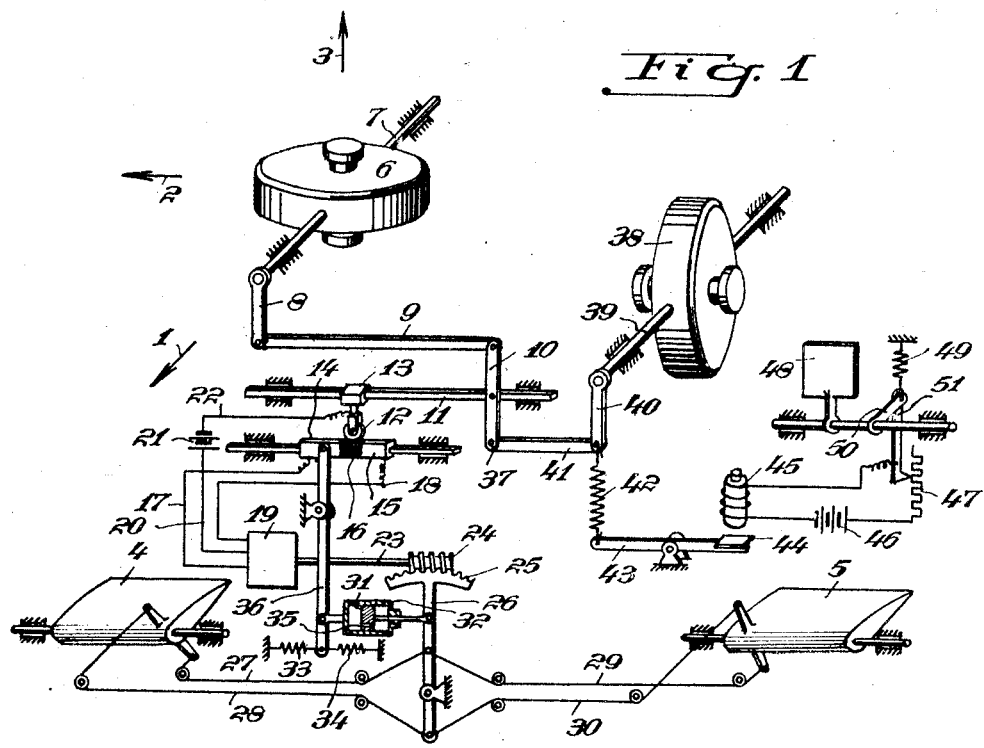
Fig. 1 shows an aileron control with an electric servo-motor and an electric arrangement for varying the deflections of the turn responsive device in accordance with those of the speed-responsive device.

The arrows 1, 2, 3 as shown in Fig. 1 indicate the direction of the longitudinal axis (at the same time direction of flight), of the transverse axis and of the normal axis. 4 and 5 denote the ailerons with the aid of which the stabilization about the longitudinal axis is to be effected. For the stabilization is employed a device responsive to the inclinations about the longitudinal axis but not responsive to lateral displacements. The device is shown in Fig. 1 in the form of a gyroscope 6 which forms a part of a gyroscopic horizon.

During the straight flight the gyroscope 6 effects the stabilization about the longitudinal axis in the following manner:

An arm 8 which acts on the differential lever 10 through the rod 9 is secured to the precession axle 7 lying in parallel relation to the direction of flight. The lever 10 shifts a further rod 11 to which is secured a contact arm 13 provided with a contact roller 12. The contact roller 12 moves over a contact block consisting of two contact pieces 14 and 15 and of the insulating piece 16 arranged therebetween. The contact block 14, 15, 16 is also slidably mounted similar to rod 11. The contacts 14 and 15 are connected to the electric motor 19 through conductors 17 and 18, the motor being supplied with energy through the conductor 20. The second pole of the power source 21 is connected to the contact arm 13 through a conductor 22. The motor drives through the shaft 23, worm 24 and the worm wheel segment 25 the control surface lever 26 which in turn actuates the ailerons 4 and 5 through the control cables 27, 28, 29 and 30.

A so-called isostatic member the piston 31 of which is provided with a passage 35 for the fluid under pressure consists further of cylinder 32 and two springs 33 and 34 and is associated with the control surface lever 26. The isostatic member acts on a lever 36 for longitudinally shifting the contact block 14, 15, 16.

It is assumed, for instance, that the airplane is unduly banked during the straight flight, so that the right-hand wing tip lies lower than the left-hand one. This causes the lever 8 to relatively move to the left. In this manner, the lever 10 is rotated about the point 37 counterclockwise thereby displacing the contact roller 12 to the left so that it engages the contact piece 14. The motor 19 is thereby energized and rotates the control surface lever 26 by means of a worm 24 in such a manner that the aileron 4 is moved in the downward direction and the aileron 5 in the upward direction, thereby causing the airplane to return to the stable position. The lever 26 exerts at the same time in a manner well known a follow-up control action by means of the isostatic member 31 and of the lever 36, moving contact block 14–16 to the left and thus disengaging the contact roller 12 from the contact piece 14 and bringing it back into contact with insulation 16 as soon as the ailerons have been sufficiently deflected.

The above-described arrangement would, however also have the tendency during the flight through a curve to maintain the transverse axis of the airplane in the horizontal position and would thus lead to dangerous flying conditions. This is avoided according to the invention by additionally influencing the aileron control by a controlling force which depends upon the turning speed. This controlling force is derived according to the invention from a gyroscopic turn indicator 38, which adjusts the fulcrum 37 of the differential lever 10 by means of the arm 40 secured to its precession axis 39 and of a rod 41 in such a manner that the aileron control brings about and maintains the sloping position necessary for the stabilization in the curve. As soon as the airplane begins to rotate about its normal axis the aileron control is caused to assume a new inclination and thereby stabilize the craft with the aid of the above-described means.

In this manner, an automatic stabilization of the airplane with respect to the longitudinal axis is attained in curves at a constant speed of the airplane.

Figure 2:
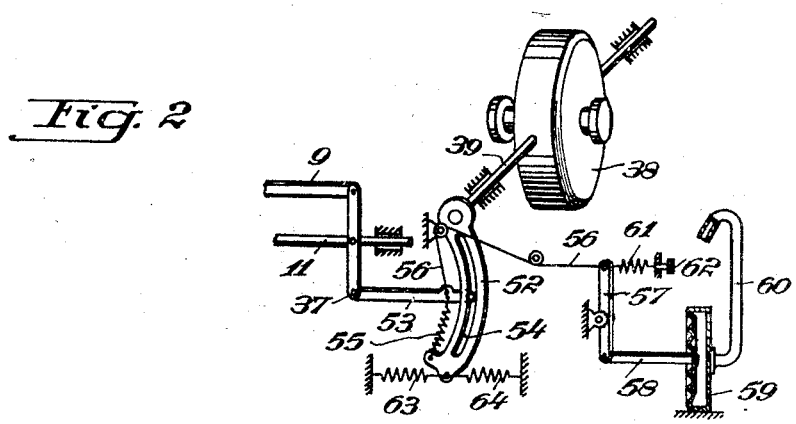
Fig. 2 shows a mechanical arrangement for varying the deflections of the turn responsive device in accordance with those of the speed-responsive device.

In considering different speeds of the airplane the additional control force supplied by the turn indicator is combined with the speed of the airplane. To this end, the deflections of the turn indicator 38 are varied in accordance with the deflections of a speed responsive device. This may be accomplished in various ways. For this purpose an electric and a mechanical arrangement is shown in Figs. 1 and 2 respectively.

In Fig. 1, 42 denotes the spring of the turn indicator 38. It is secured to one end of a two-armed lever 43, the other end of which carries the armature 44 of an electromagnet 45. The exciting current for the magnet 45 is supplied by a power source 46 and the intensity thereof may be varied by means of a resistance 47. The value of the resistance 47 is varied by a speedometer, shown in Fig. 1 as a wind vane 48, with the aid of the lever 50 influenced by the spring 49, and of the slide rod 51.

The operation of the arrangement is as follows: The greater the speed of the airplane is at constant turning speed about the normal axis, the greater the radius of curvature of the curve flown by the airplane and the smaller the bank required for maintaining the stability. Consequently, this implies that the action of the turn indicator on the control must be the smaller the greater the speed of the airplane. This may be accomplished with the aid of the above-described arrangement by influencing the device for varying the deflection in such a manner that the deflections of the turn indicator decrease with increasing speed of the airplane. During a rapid flight the wind vane 48 is pressed rearwardly. In this case, the wind vane 48 moves the lever 50 and the rod 51 in the downward direction, thus reducing the resistance 47 and increasing the current in the electromagnet 45.

The armature 44 is pulled up to a greater extent and the spring 42 for the gyroscope 38 is, consequently, further stretched. This causes the arm 40 to rotate to a lesser extent and, consequently, the point 37 to be shifted a smaller amount than in the case of a slower flight.

In Fig. 2 is shown an arrangement which permits to vary the action of the turn indicator in accordance with the speed of the airplane by mechanical means. The parts shown in Fig. 2 corresponding to the parts of Fig. 1 are denoted by the same reference numerals. The operating arm 52 of Fig. 2 corresponding to the arm 40 of Fig. 1 is designed in the form of an arcuated slotted element which acts on the fulcrum 37 of the lever 10 by means of the rod 53 guided in slot 54. The action of the turn indicator is varied in this case in accordance with the speed of the airplane in the following manner: The sliding pivot of rod 53 in arm 52 is so designed that it may be displaced in the slot 54. The effective length of arm 52 may thus be varied, whereby different displacements of the point 37 may be obtained with an equal angular deflection of arm 52. The joint is displaced on arm 52 in accordance with the speed of the airplane in the following manner: To the rod 53 is secured a tension spring 55, the other end of which is connected to the end of the lever 52. This spring has therefore the tendency to swing the rod 53 in a downward direction and to render the effective length of arm 52 as great as possible. Opposite to the force of the spring 55 acts a control wire 56 which passes over two rollers and is secured to one end of the two-armed lever 57. This lever is actuated at its other end by rod 58. This rod is in operative connection with a measuring gauge 59 to which the dynamic pressure depending upon the speed of the airplane is supplied by means of a conduit 60.

Upon an increase of the speed of the airplane the rod 58 is shifted to the left, the control wire 56 moves the lever 53 opposite to the force of the spring 55 in the upward direction and thus shortens the effective length of arm 52, thereby diminishing the action of the turn indicator on the aileron control. The turn indicator is in this case under the influence of the springs 63 and 64. The slot in the arm 52 is preferably so designed that a rotation of the lever 53—as is caused by the changes in speed without the arm 52 being simultaneously deflected, i. e., in straight flight—does not cause a displacement of point 37. Consequently, the slot is preferably designed in the form of a segment of a circle, the radius of which is equal to the length of the rod 53. In order to influence the action of the speed of the airplane on the effective length of arm 52, the lever 57 is connected with a spring 61, the tension of which may be adjusted by means of a set screw 62.

Another embodiment of my invention is shown in Fig. 3 in diagrammatic form, in which is shown an aileron control, in which the stabilization about the longitudinal axis is also effected with the aid of a horizon. The horizon is in this case not as in the straight flight allotted to the true vertical, but to the apparent vertical, since the airplane rounds properly the curve only when its own vertical axis coincides with the direction of the apparent vertical. The horizon is allotted to the apparent vertical in the manner that the part of the intermediate controlling device connected with the horizon is adjusted by an angle corresponding to the inclination of the apparent vertical to the true vertical.

This angle which is designated as apparent vertical angle may be determined with the aid of a simple pendulum subject, however, to the difficulties enumerated below. Besides the acceleration of gravity $g$ also the centrifugal acceleration $c$ acts on such a pendulum when the airplane rounds a curve. The apparent angle $\alpha$ may then be determined from the formula $$tg\,\alpha = \frac{c}{g}$$

The centrifugal acceleration may be obtained from the product of the speed of flight $v$ and the turning speed $\omega$ about the normal axis. It follows then that the apparent vertical angle may be attained from the following formula:

$$tg\,\alpha = \frac{v \cdot \omega}{g}$$

This fact is taken advantage of in carrying out the invention according to the embodiment shown in Fig. 3. The apparent vertical angle which is essential to the adjustment of the above-mentioned part of the intermediate controlling device of the horizon is not determined with the aid of a pendulum, since such a pendulum besides being subjected to the above-mentioned accelerations, owing to the interfering forces caused by squalls, cross winds and the like is also subjected to other accelerations which cause a false indication of the apparent vertical. These disadvantages are avoided by deriving the apparent vertical angle from the speed of flight $v$ and the turning speed $\omega$. The part of the intermediate controlling device of the horizon is then adjusted in accordance with the apparent vertical angle thus determined.

In the embodiment shown diagrammatically in Fig. 3 is illustrated an automatic adjustment of the part of the intermediate controlling device of the horizon in accordance with the speed of flight and the turning speed. The value of the turning speed is given by a gyro turn indicator 65 to the precession axis of which is secured a contact lever 66 which sweeps over a parallel resistance winding 67 located in the phase lead R of a three-phase system. The other two phase leads of the three-phase system are denoted by the reference characters S and T.

The contact lever is adjusted according to the value of the turning speed by the turn indicator 65 so that phase winding 70ᵃ of a motor 70 receives a voltage in value and direction corresponding to the turning speed and direction of the plane. At 68 is shown an aneroid speedometer operating according to the principle of the static tube and which adjusts the contact lever 69 in accordance with the value of the speed of flight measured by the speedometer. Accordingly, phase winding 70ᵇ of the motor receives a voltage from the phase ST, the value of which is proportional to the speed of the airplane. Motor 70 is designed as a two-phase rotating field motor. It produces by conveniently selecting the constants, a torque which is proportional to the product of the speed of flight and turning speed. The rotating field motor 70 is under the control of springs and actuates against the tension of these springs a rod 71 to which is connected one variable element of the intermediate controlling device of the horizon. This intermediate controlling device should have two variable elements. In the present case as intermediate controlling device, for instance a bolometer amplifier may be employed which consists of the slotted plate 72 from which the air jets emanate, the movable vane 73, controlling the jets, and the wire resistances 73ᵃ disposed in the path of the jets and shielded from or exposed to these jets according to the position of vane 73. The aforementioned rod 71 is in this case connected to slot plate 72 of the bolometer. Owing to the torque produced by the rotating field motor slotted plate 72 is adjusted by an amount which corresponds to the angle determined by the above-indicated formula. Vane 73 of the bolometer is connected to the gyroscope 74 of a gyroscopic horizon which transmits the control impulses in accordance with the inclination about the longitudinal axis. The resistances 73ᵃ of the bolometer amplifier are connected in a well-known manner to a rotary magnet 75 the armature of which operates the control member 76 of a hydraulic or pneumatic servo-motor 77. With the aid of the servo-motor 77 the control cables for the aileron surfaces are then actuated in a manner well known.

The servo-motor arrangement is equipped with a return control or follow-up control device in a manner well known in the art. The return control device may, for instance, consist of a plate spring designed in the form of a power differential.

The plate spring 78 is firmly secured to the rotor shaft of the rotary magnet 75 or, generally speaking, to the adjusting member of the magnet and pivotally connected to the slide valve of the motor control member 76 as well as to the piston rod of the servo-motor 77. By means of this plate spring the slide valve is brought back to its neutral position after the motor piston has moved to the desired extent, so that the piston stops.

I claim as my invention:

1. An aileron control for airplanes having means connected to the ailerons for producing a roll control moment responsive solely to plane inclinations about its longitudinal axis irrespective of any lateral drift displacement of the plane, and means connected to the ailerons and responsive to lateral turns of the plane axis from the direction of flight, for producing an additional and corrective roll control moment in accordance with the desired curvature of the flight path.

2. In combination with an airplane an aileron control, comprising a gyroscopic horizon for producing a roll control moment responsive to inclinations of the plane about its longitudinal axis, a servomotor device operatively connecting said gyroscopic horizon and the ailerons to be controlled, a turn indicator responsive to lateral turns of said plane for producing an additional roll control moment according to the curvature of the flight path, and an operative connection between said turn indicator and said servomotor.

3. In combination with an airplane an aileron control, comprising a gyroscopic horizon for producing a roll control moment responsive to inclinations of the plane about its longitudinal axis, a servomotor device operatively connecting said gyroscopic horizon and the ailerons to be controlled, a gyroscopic turn indicator responsive to lateral turns of the plane, connecting means disposed between said indicator and said servomotor for effecting an additional roll control moment according to the curvature of the flight, and a speedometer coupled with said connecting means for correcting in accordance with the speed of the plane the roll control moment produced by said turn indicator.

4. In combination with an airplane an aileron control, comprising an automatic controlling device connected with the ailerons of the plane, said controlling device having a movable actuating member, a differential mechanism connected with said member for moving said member responsive to two control forces imposed on said mechanism, a gyroscopic horizon operatively connected with said mechanism for producing one of said control forces in accordance with inclinations of the plane about its longitudinal axis, and a gyroscopic turn indicator also operatively connected with said mechanism for producing said second control force in accordance with the curvature of the flight.

5. In combination with an airplane an aileron control, comprising an automatic controlling device connected with the ailerons of the plane, said controlling device having a movable actuating member, a differential mechanism connected with said member for moving said member responsive to two control forces imposed on said mechanism, a gyroscopic horizon operatively connected with said mechanism for producing one of said control forces in accordance with inclinations of the plane about its longitudinal axis, a turn indicator responsive to lateral turns of the plane for producing said second control force in accordance with the curvature of the flight, means connecting said turn indicator with said mechanism, and a speed indicator operatively coupled with said connecting means for correcting said second control force in dependency on the speed of the plane.

6. In combination with an airplane an aileron control, comprising an automatic controlling device connected with the ailerons of the plane, said controlling device having a movable actuating member, a differential mechanism connected with said member for moving said member responsive to two control forces imposed on said mechanism, a gyroscopic horizon operatively connected with said mechanism for producing one of said control forces in accordance with inclinations of the plane about its longitudinal axis, a gyroscopic turn indicator connected with said actuating member for producing said second control force in accordance with the curvature of lateral turns of the plane, a lever disposed within said connection between said turn indicator and said actuating member, said lever being adapted for varying its effective length, a speedometer, and means operatively connecting said speedometer with said lever for adjusting the effective length of said lever in order to vary the relation between the movements of said turn indicator and said actuating member in dependency on the speed of the plane.

7. Control apparatus for aircraft, comprising means responsive to the motion of a craft about one axis thereof to produce a controlling effect on the craft, and means responsive to the rate of turn of the craft about another axis thereof coacting with said first means whereby the control effect of said first means is modified in accordance with said rate of turn.

8. Control apparatus for aircraft, comprising means responsive to a change in the attitude of a craft with respect to one axis thereof to produce a controlling effect on the craft, means responsive to the rate of turn of the craft about another axis thereof coacting with said first means to modify the effect thereof, and means responsive to the speed of the craft for modifying said effects during turning of the craft.

9. Control apparatus for aircraft, comprising means responsive to a change in the attitude of a craft with respect to one axis thereof to produce a roll control moment, and means responsive to the rate of turn of the craft about another axis thereof coacting with said first means whereby the roll control moment of said first means is modified in accordance with said rate of turn.

10. Control apparatus for aircraft, comprising means responsive to the change in attitude of the craft with respect to one axis thereof to produce a roll control moment, means responsive to the rate of turn of the craft about another axis thereof coacting with said first means to modify the roll control moment thereof, and means responsive to the speed of the craft for modifying said moment during turning of the craft.

11. In combination with an aircraft, a control surface therefor, gyroscopic means responsive to the inclination of the craft about one axis thereof for producing a control effect, gyroscopic means responsive to the rate of turn of the craft about another axis thereof, and speed responsive means cooperating with said gyroscopic means whereby said control effect is modified, and means controlling said control surface in response to said modified control effect whereby the vertical axis of the craft itself is maintained in the apparent vertical.

12. In combination with an aircraft, a control surface therefor, means responsive to a change in attitude of the craft about one axis thereof, lever means controlled by said responsive means, means responsive to the rate of turn of the craft about another axis thereof whereby the fulcrum of said lever means is changed in response to said rate of turn means, means responsive to the speed of the craft whereby the effect of said rate of turn device is modified, and means controlled by said lever means whereby said control surface is governed to produce stabilization of the craft about said one axis.

13. Control apparatus for aircraft, comprising means responsive to a change in attitude of the craft about one axis thereof, lever means controlled by said responsive means, means responsive to the rate of turn of the craft about another axis thereof, an arcuate slotted lever actuated by said rate of turn device, a link connected to said lever means and mounted for movement in said slot, and means responsive to the speed of the craft for controlling the position of said link.

14. In combination with an aircraft, a control surface therefor, a servo-motor connected to said surface, and means for controlling the operation of said servo-motor, comprising means responsive to an inclination of the craft about one axis thereof and means coacting with said responsive means, motor means controlling said coacting means and means for controlling said motor means, comprising means responsive to the rate of turn of the craft about another axis thereof and speed responsive means coacting with said rate of turn responsive means.

EDUARD FISCHEL.